United States Patent
Gao et al.

(10) Patent No.: US 11,430,157 B1
(45) Date of Patent: Aug. 30, 2022

(54) EFFECTS IN ARTIFICIAL REALITY BASED ON ENVIRONMENTAL FEATURES

(71) Applicant: Meta Platforms Technologies, LLC, Menlo Park, CA (US)

(72) Inventors: Xiaoyang Gao, Palo Alto, CA (US); Rahul Prasad, San Francisco, CA (US); Krishnan Ramnath, Sunnyvale, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/663,163

(22) Filed: Oct. 24, 2019

(51) Int. Cl.
*G06T 19/00* (2011.01)
*G06T 19/20* (2011.01)
*G06T 11/00* (2006.01)
*G06F 3/0482* (2013.01)
*G10L 25/51* (2013.01)
*G06F 3/04847* (2022.01)
*G06V 20/20* (2022.01)

(52) U.S. Cl.
CPC ............ *G06T 11/00* (2013.01); *G06F 3/0482* (2013.01); *G06F 3/04847* (2013.01); *G06V 20/20* (2022.01); *G10L 25/51* (2013.01)

(58) Field of Classification Search
None
See application file for complete search history.

(56) References Cited

U.S. PATENT DOCUMENTS

| | | | | |
|---|---|---|---|---|
| 10,133,951 | B1 * | 11/2018 | Mendonca | G06K 9/4642 |
| 10,445,942 | B1 * | 10/2019 | Pekelny | G06F 3/011 |
| 2017/0206691 | A1 * | 7/2017 | Harrises | G02B 27/0172 |
| 2017/0345270 | A1 * | 11/2017 | Singh | G08B 21/02 |
| 2020/0082588 | A1 * | 3/2020 | Fink | G06K 9/726 |

* cited by examiner

*Primary Examiner* — Tize Ma
(74) *Attorney, Agent, or Firm* — Foley & Lardner LLP

(57) ABSTRACT

Disclosed herein are related to a device and a method of generating triggers to provide effects to an artificial reality based on features in an environment. In one aspect, a set of candidate triggers for applying effects to the artificial reality provided by the device is determined according to features in an environment. In one aspect, a subset of the set of candidate triggers is determined according to a predetermined policy. In one aspect, corresponding effects to apply to the artificial reality are generated by the device according to the subset of the set of candidate triggers.

18 Claims, 8 Drawing Sheets

EFFECTS IN ARTIFICIAL REALITY BASED ON ENVIRONMENTAL FEATURES

FIELD OF DISCLOSURE

The present disclosure is generally related to controlling an artificial reality, including but not limited to automatically detecting one or more triggers to provide effects to the artificial reality based on environmental features and providing effects to the artificial reality according to the one or more triggers detected.

BACKGROUND

An artificial reality such as a virtual reality (VR), an augmented reality (AR), or a mixed reality (MR) provides immersive experience to a user. In one example, a movement of a user wearing a head mounted display (HMD) can be detected, and an image of an artificial reality corresponding to the movement can be rendered. For example, a user wearing the HMD can turn his head to the left, and an image of a virtual object corresponding to a location of the HMD and an orientation of the HMD can be displayed on the HMD to allow the user to feel as if the user is moving within a space of an artificial reality (e.g., a VR space, an AR space, or a MR space).

In some cases, various information can be presented to a user of the HMD to enhance user experience. For example, a user interface can be presented to allow a user to select and initiate an application for artificiality reality. For example, a user interface can be presented to allow a user to modify settings of how the artificial reality is presented. For another example, a user of the HMD can search for particular information through an application executing on the HMD, and the information can be presented to the user through the HMD.

SUMMARY

Various embodiments disclosed herein are related to a system for generating effects to apply to an artificial reality. In some embodiments, a set of candidate triggers for applying effects to the artificial reality provided by a device for an environment is determined by a device according to features in the environment. In some embodiments, a subset of the set of candidate triggers is determined by the device according to a predetermined policy. In some embodiments, corresponding effects to apply to the artificial reality are generated by the device according to the subset of the set of candidate triggers.

In some embodiments, the features in the environment are detected by the device. In some embodiments, at least one of the detected features is provided to a remote server to cause the remote server to detect a first candidate trigger for applying effects to the artificial reality. In some embodiments, the set of candidate triggers is determined by the device. The set of candidate triggers may include the first candidate trigger detected by the remote server.

In some embodiments, detecting, by the device, the features in the environment includes capturing an image of the environment, and detecting, as one of the features in the environment, a predetermined shape or structure in the captured image. In some embodiments, detecting, by the device, the features in the environment includes capturing an audio signal of a sound in the environment, and detecting, as one of the features in the environment, a predetermined pattern in the audio signal. In some embodiments, generating the corresponding effects to apply to the artificial reality includes modifying a setting of a presentation of the artificial reality, presenting a virtual object in the artificial reality, presenting information via the artificial reality, presenting a sound for the artificial reality, or presenting a profile via the artificial reality.

In some embodiments, rankings of the set of candidate triggers are determined, and the subset of the set of candidate triggers is determined according to the rankings. In some embodiments, the rankings are determined according to scores or categories of the set of candidate triggers.

In some embodiments, the predetermined policy specifies a number of effects to apply to the artificial reality within a time period. In some embodiments, determining the subset of the set of candidate triggers includes presenting selectable indications of the set of candidate triggers to a user of the artificial reality, and receiving a selection of one or more of the subset of the set of candidate triggers from the user.

Various embodiments disclosed herein are related to a system for presenting artificial reality. In some embodiments, the system includes a processor, and a non-transitory computer readable medium storing instructions. In some embodiments, the instructions when executed by the processor cause the processor to determine, according to features in an environment, a set of candidate triggers for applying effects to an artificial reality provided for the environment. In some embodiments, the instructions when executed by the processor cause the processor to determine, according to a predetermined policy, a subset of the set of candidate triggers. In some embodiments, the instructions when executed by the processor cause the processor to generate, according to the subset of the set of candidate triggers, corresponding effects to apply to the artificial reality.

In some embodiments, the instructions when executed by the processor cause the processor to detect the features in the environment. In some embodiments, the instructions when executed by the processor cause the processor to provide at least one of the detected features to a remote server to cause the remote server to detect a first candidate trigger for applying effects to the artificial reality. In some embodiments, the instructions when executed by the processor cause the processor to determine the set of candidate triggers, the set of candidate triggers including the first candidate trigger detected by the remote server.

In some embodiments, the instructions when executed by the processor cause the processor to capture an image of the environment, and detect, as one of the features in the environment, a predetermined shape or structure in the captured image. In some embodiments, the instructions when executed by the processor cause the processor to capture an audio signal of a sound in the environment, and detect, as one of the features in the environment, a predetermined pattern in the audio signal. In some embodiments, the instructions when executed by the processor cause the processor to generate the corresponding effects to apply to the artificial reality by modifying a setting of a presentation of the artificial reality, presenting a virtual object in the artificial reality, presenting information via the artificial reality, presenting a sound for the artificial reality, or presenting a profile via the artificial reality.

In some embodiments, the instructions when executed by the processor cause the processor to determine rankings of the set of candidate triggers, and determine the subset of the set of candidate triggers according to the rankings. In some embodiments, the instructions when executed by the processor cause the processor to determine the rankings according to scores or categories of the set of candidate triggers.

In some embodiments, the predetermined policy specifies a number of effects to apply to the artificial reality within a time period. In some embodiments, the instructions when executed by the processor cause the processor to determine the subset of the set of candidate triggers by presenting selectable indications of the set of candidate triggers to a user of the artificial reality, and receiving a selection of one or more of the subset of the set of candidate triggers from the user of the artificial reality.

Various embodiments disclosed herein are related to a non-transitory computer readable medium storing instructions for presenting an artificial reality. In some embodiments, the instructions when executed by a processor cause the processor to determine, according to features in an environment, a set of candidate triggers for applying effects to an artificial reality provided for the environment. In some embodiments, the instructions when executed by the processor cause the processor to determine, according to a predetermined policy, a subset of the set of candidate triggers. In some embodiments, the instructions when executed by the processor cause the processor to generate, according to the subset of the set of candidate triggers, corresponding effects to apply to the artificial reality.

In some embodiments, the non-transitory computer readable medium further includes instructions when executed by the processor cause the processor to detect the features in the environment. In some embodiments, the non-transitory computer readable medium further includes instructions when executed by the processor cause the processor to provide at least one of the detected features to a remote server to cause the remote server to detect a first candidate trigger for applying effects to the artificial reality. In some embodiments, the non-transitory computer readable medium further includes instructions when executed by the processor cause the processor to determine the set of candidate triggers, the set of candidate triggers including the first candidate trigger detected by the remote server.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Figure 1:
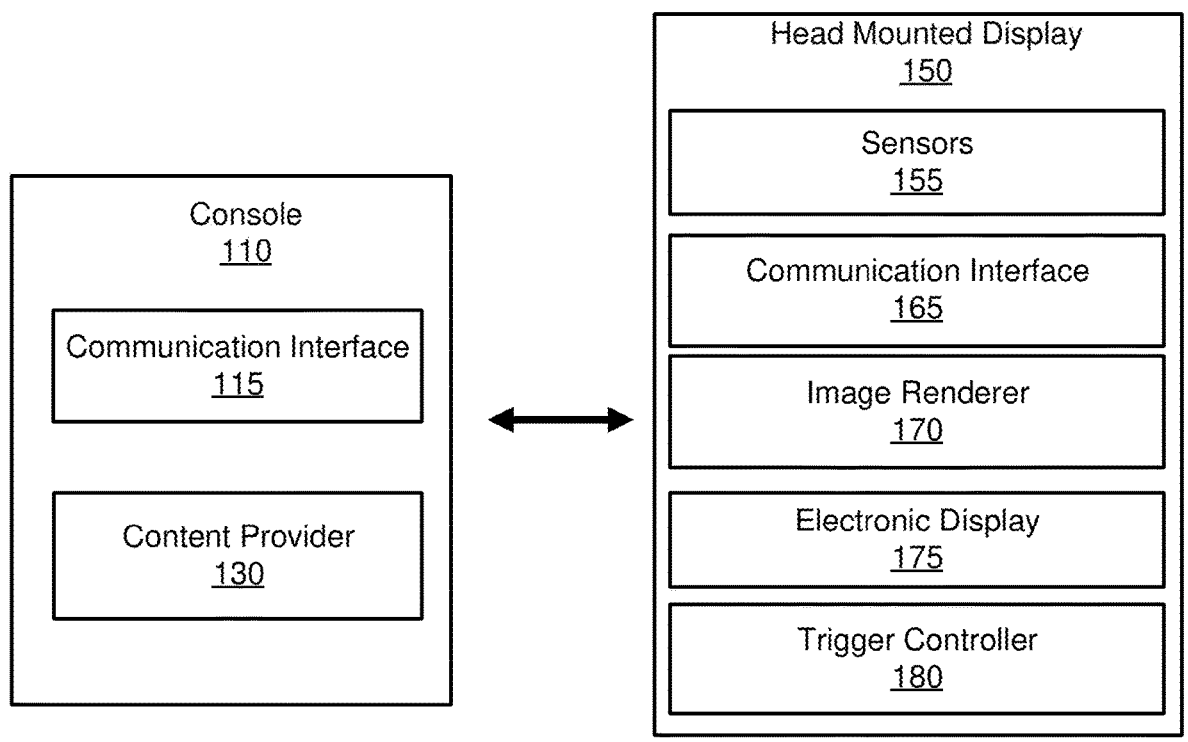
FIG. 1 is a diagram of a system environment including an artificial reality system, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are embodiments related to systems and methods for generating one or more effects to apply to an artificial reality presented by a device (e.g., head mounted display), according to features in an environment surrounding the device. Examples of features include a predetermined shape or structure (e.g., outline, schematic, dimensions, pattern, code, text) of an object, color(s) or other characteristics of an object, a predetermined sound, a location of the device, a wireless signal detected by the device, etc. In one aspect, a set of candidate triggers is determined according to the detected features in the environment. Candidate triggers are candidates of triggers that may cause, trigger and/or control effects to the artificial reality. In one aspect, a subset of candidate triggers from the set of candidate triggers is selected according to a predetermined policy. Examples of the predetermined policy can include a rule indicating a number (e.g., a specific, maximum or minimum number) of triggers to present within a time period, a rule indicating an available area (e.g., in a field of view of a user) to apply effects of one or more triggers, a rule indicating one or more types of candidate triggers to prioritize, etc. According to the subset of the candidate triggers, corresponding effects to apply to the artificial reality can be generated.

In one aspect, the disclosed systems and methods can allow a user of a device (e.g., head mounted display, smart phone) to easily obtain and/or access information (e.g., supplemental, assisting or augmented information), effects (e.g., augmented, user experience enhancing effects), cues, prompts, highlights, and so on (sometimes generally referred as effects), while enjoying the artificial reality. For example, one or more features in the environment surrounding a user of the head mounted display may be automatically detected, and one or more triggers corresponding to the detected features may be determined. In one aspect, a trigger corresponds to an intent of the user, or a user driven or user influenced action, to apply one or more effects to the artificial reality, according to an environmental input. For example, a user wearing a head mounted display may move and/or orient his/her head to view a certain object, and information associated with the object can be presented on the head mounted display. For example, a user wearing the device may view a text in a first language, and a translation into a second language may be presented on the head mounted display. Accordingly, effects corresponding to the user intent can be rendered in an artificial reality, without relying on a dedicated or complex input device (e.g., pointing device or a keyboard).

In one aspect, the disclosed systems and methods can allow a user to enjoy the artificial reality experience without getting disturbed by irrelevant or excess information. In one example, various features in the environment surrounding a display (e.g., head mounted display) may correspond to different triggers for applying effects to the artificial reality. While automatically executing triggers for applying effects to the artificial reality according to various features detected in the environment allows a user to easily obtain information without a dedicated hardware or an input device, excessive or irrelevant information may disturb or degrade the user experience. Advantageously, a subset of different triggers can be determined or shortlisted according to one or more policies (e.g., to identify triggers relevant to a context and/or user), and corresponding effects can be applied to the artificial reality according to the determined subset of the triggers. Hence, more relevant or important information can be rendered in the artificial reality, where less relevant or less important information can be omitted or presented at a later time.

FIG. 1 is a block diagram of an example artificial reality system environment 100 in which a console 110 operates. In some embodiments, the artificial reality system environment 100 includes a HMD 150 worn by a user, and a console 110 providing content of an artificial reality to the HMD 150. In one aspect, the HMD 150 may detect its location, orientation, and/or a gaze direction of the user wearing the HMD 150, and can provide the detected location and the gaze direction to the console 110. The console 110 may determine a view within the space of the artificial reality corresponding to the detected location, orientation, and/or the gaze direction, and generate an image depicting the determined view. The console 110 may provide the image to HMD 150 for rendering. In some embodiments, the artificial reality system environment 100 includes more, fewer, or different components than shown in FIG. 1. In some embodiments, functionality of one or more components of the artificial reality system environment 100 can be distributed among the components in a different manner than is described here. For example, some of the functionality of the console 110 may be performed by the HMD 150. For example, some of the functionality of the HMD 150 may be performed by the console 110. In some embodiments, the console 110 is integrated as part of the HMD 150.

In some embodiments, the HMD 150 includes or corresponds to an electronic component that can be worn by a user and can present or provide an artificial reality experience to the user. The HMD 150 may render one or more images, video, audio, or some combination thereof to provide the artificial reality experience to the user. In some embodiments, audio is presented via an external device (e.g., speakers and/or headphones) that receives audio information from the HMD 150, the console 110, or both, and presents audio based on the audio information. In some embodiments, the HMD 150 includes sensors 155, a communication interface 165, an image renderer 170, an electronic display 175, and/or a trigger controller 180. These components may operate together to detect a location and an orientation of the HMD 150, and/or a gaze direction of the user wearing the HMD 150, and can render an image of a view within the artificial reality corresponding to the detected location and the orientation of the HMD 150, and/or the gaze direction of the user. In other embodiments, the HMD 150 includes more, fewer, or different components than shown in FIG. 1. In some embodiments, the trigger controller 180 may be activated or deactivated according to a control from a user of the HMD 150.

In some embodiments, the sensors 155 include electronic components or a combination of electronic components and software components that detect a location, an orientation of the HMD 150, and/or a gaze direction of the user. Examples of sensors 155 can include: one or more imaging sensors, one or more accelerometers, one or more gyroscopes, one or more magnetometers, a global positioning system, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the imaging sensors can capture an image for detecting a physical object, a user gesture, a shape of the hand, a user interaction, etc. In some embodiments, the sensors 155 detect the translational movement and the rotational movement, and determine an orientation and location of the HMD 150. In one aspect, the sensors 155 can detect the translational movement and the rotational movement with respect to a previous orientation and location of the HMD 150, and determine a new orientation and/or location of the HMD 150 by accumulating or integrating the detected translational movement and/or the rotational movement. Assuming for an example that the HMD 150 is oriented in a direction 25 degrees from a reference direction, in response to detecting that the HMD 150 has rotated 20 degrees, the sensors 155 may determine that the HMD 150 now faces or is oriented in a direction 45 degrees from the reference direction. Assuming for another example that the HMD 150 was located two feet away from a reference point in a first direction, in response to detecting that the HMD 150 has moved three feet in a second direction from the reference point, the sensors 155 may determine that the HMD 150 is now located at a vector multiplication of the two feet in the first direction and the three feet in the second direction. In one aspect, according to the location and the orientation of the HMD 150, a gaze direction of the user can be determined or estimated. In some embodiments, a user of the HMD 150 can configure the HMD 150 (e.g., via user settings) to enable or disable sensors (e.g., eye trackers). In some embodiments, a user of the HMD 150 is prompted to enable or disable the eye trackers.

In some embodiments, the sensors 155 include electronic components or a combination of electronic components and software components that generate sensor measurement corresponding to an environment surrounding the HMD 150. Examples of the sensors 155 for generating sensor measurements include one or more microphones, one or more imaging sensors, one or more wireless signal detectors, one or more of the sensors used for detecting a location and/or orientation of the HMD 150, etc. In one implementation, each sensor 155 is configured to generate a sensor measurement in or on a corresponding surface. A surface may be a corresponding dimension or a corresponding aspect of an environment surrounding the HMD 150. In one example, a microphone can detect a sound and generate an audio signal electrically describing the detected sound. In one example, an imaging sensor can capture an image corresponding to a view of the user (or a view from a location of the HMD 150 according to an orientation of the HMD 150). In one example, a wireless signal detector can receive a wireless signal at a predetermined frequency (e.g., ISM, Wi-Fi, any cellular frequency bands, or any frequency), and detect a nearby device according to the wireless signal. In one example, a global positioning system can determine a location of the HMD 150.

In some embodiments, the communication interface 165 includes an electronic component or a combination of an electronic component and a software component that communicates with the console 110. The communication interface 165 may communicate with a communication interface 115 of the console 110 through a communication link. The communication link may be a wireless link, a wired link, or both. Examples of the wireless link can include a cellular communication link, a near field communication link, Wi-Fi, Bluetooth, or any communication wireless communication link. Examples of the wired link can include a universal serial bus (USB), Ethernet, Firewire, high-definition multimedia interface (HDMI), or any wired communication link. In the embodiments, in which the console 110 and the HMD 150 are implemented on a single system, the communication interface 165 may communicate with the console 110 through at least a bus connection or a conductive trace. Through the communication link, the communication interface 165 may transmit to the console 110 data indicating the determined location of the HMD 150 and the orientation of the HMD 150, and/or the gaze direction of the user. Moreover, through the communication link, the communication interface 165 may receive from the console 110 data indicating image to be rendered. In some embodiments, the communication interface 165 is implemented as a wireless signal detector to detect a nearby device.

In some embodiments, the image renderer 170 includes an electronic component or a combination of an electronic component and a software component that generates one or more images for display, for example, according to a change in view of the space of the artificial reality. In some embodiments, the image renderer 170 is implemented as a processor (or a graphical processing unit (GPU)). The image renderer 170 may receive, through the communication interface 165, data describing an image to be rendered, and render the image through the electronic display 175. In some embodiments, the data from the console 110 may be compressed or encoded, and the image renderer 170 may decompress or decode the data to generate and render the image. The image renderer 170 may receive the compressed image from the console 110, and decompress the compressed image, such that a communication bandwidth between the console 110 and the HMD 150 can be reduced. In one aspect, the process of detecting, by the HMD 150, the location of the HMD 150, the orientation of the HMD and/or the gaze direction of the user wearing the HMD 150, and generating and transmitting, by the console 110, a high resolution image (e.g., 1920 by 1080 pixels) corresponding to the detected location, the orientation, and/or the gaze direction to the HMD 150 may be computationally exhaustive and may not be performed within a frame time (e.g., less than 11 ms). The image renderer 170 may generate one or more images through a shading process and a reprojection process when an image from the console 110 is not received within the frame time. For example, the shading process and the reprojection process may be performed adaptively, according to a change in view of the space of the artificial reality.

In some embodiments, the electronic display 175 is an electronic component that displays an image. The electronic display 175 may, for example, be a liquid crystal display or an organic light emitting diode display. The electronic display 175 may be a transparent display that allows the user to see through. In some embodiments, when the HMD 150 is worn by a user, the electronic display 175 is located proximate (e.g., less than 3 inches) to the user's eyes. In one aspect, the electronic display 175 emits or projects light towards the user's eyes according to image generated by the image renderer 170.

In some embodiments, the trigger controller 180 includes an electronic component or a combination of an electronic component and a software component, that generates one or more effects to apply to the artificial reality according to one or more features detected. In one approach, the trigger controller 180 detects one or more features according to sensor measurements from the sensors 155, and determines a set of candidate triggers according to the detected features in the environment. In some embodiments, the trigger controller 180 determines a subset of the set of candidate triggers according to one or more predetermined policies. In one example, the trigger controller 180 may rank the set of candidate triggers, and determine a subset of the candidate triggers to present according to rankings of the set of candidate triggers. In one example, the trigger controller 180 may determine a subset of the candidate triggers for an available area of the display. In one example, the trigger controller 180 may determine a subset of the candidate triggers according to a user selection. Detailed description on determining a set of candidate triggers and determining a subset of the set of candidate triggers are provided below with respect to FIGS. 3-8. Advantageously, a subset of different triggers can be determined according to one or more policies, and corresponding effects can be applied to the artificial reality according to the determined subset of the triggers, such that more relevant or more important information can be rendered in the artificial reality, while less relevant or less important information can be omitted.

In some embodiments, the console 110 is an electronic component or a combination of an electronic component and a software component that provides content to be rendered through the HMD 150. In one aspect, the console 110 includes a communication interface 115 and a content provider 130. These components may operate together to determine a view of the artificial reality corresponding to the location of the HMD 150, the orientation of the HMD 150, and/or the gaze direction of the user of the HMD 150, and can generate an image of the artificial reality corresponding to the determined view. In other embodiments, the console 110 includes more, fewer, or different components than shown in FIG. 1. In some embodiments, the console 110 performs some or all functionalities of the HMD 150. In some embodiments, the console 110 is integrated as part of the HMD 150 as a single device.

In some embodiments, the communication interface 115 is an electronic component or a combination of an electronic component and a software component that communicates with the HMD 150. The communication interface 115 may be a counterpart component to the communication interface 165 to communicate through a communication link (e.g., USB cable). Through the communication link, the communication interface 115 may receive from the HMD 150 data indicating the determined location of the HMD 150, the orientation of the HMD 150, and/or the determined gaze direction of the user. Moreover, through the communication link, the communication interface 115 may transmit to the HMD 150 data describing an image to be rendered.

The content provider 130 is a component that generates content to be rendered according to the location of the HMD 150, the orientation of the HMD 150, and/or the gaze direction of the user of the HMD 150. In one aspect, the content provider 130 determines a view of the artificial reality according to the location of the HMD 150, the orientation of the HMD 150, and/or the gaze direction of the user of the HMD 150. For example, the content provider 130 maps the location of the HMD 150 in a physical space to a location within a virtual space, and determines a view of the virtual space along the gaze direction from the mapped location in the virtual space. The content provider 130 may generate image data describing an image of the determined view of the virtual space, and transmit the image data to the HMD 150 through the communication interface 115. In some embodiments, the content provider 130 generates metadata including motion vector information, depth information, edge information, object information, etc., associated with the image, and transmits the metadata with the image data to the HMD 150 through the communication interface 115. The content provider 130 may compress and/or encode the data describing the image, and can transmit the compressed and/or encoded data to the HMD 150. In some embodiments, the content provider 130 generates and provides the image to the HMD 150 periodically (e.g., every 11 ms).

Figure 2:
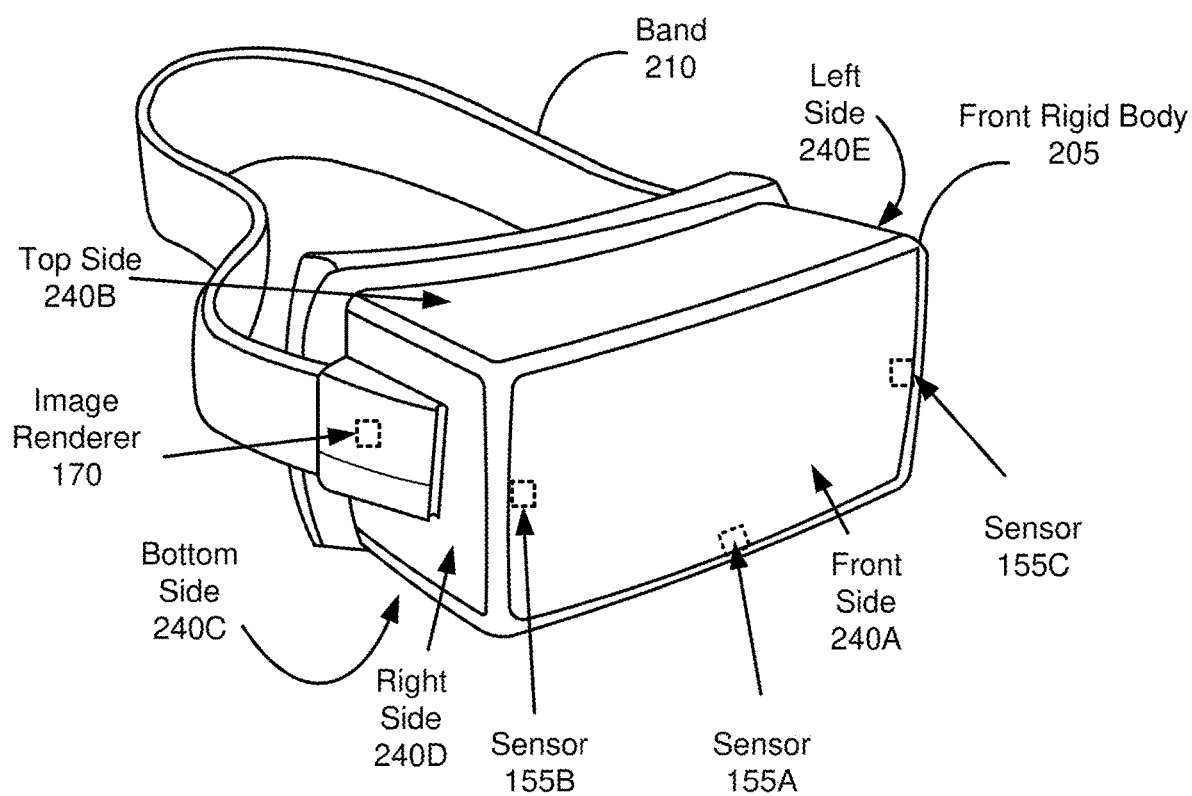
FIG. 2 is a diagram of a head mounted display, according to an example implementation of the present disclosure.

FIG. 2 is a diagram of the HMD 150, in accordance with an example embodiment. In some embodiments, the HMD 150 includes a front rigid body 205 and a band 210. The front rigid body 205 includes the electronic display 175 (not shown in FIG. 2), the sensors 155A, 155B, 155C, and the image renderer 170. The sensor 155A may be an accelerometer, a gyroscope, a magnetometer, or another suitable type of sensor that detects motion and/or location. The sensors 155B, 155C may be imaging sensors that capture images for detecting a physical object, a user gesture, a shape of a hand, a user interaction, etc. The HMD 150 may include additional components (e.g., GPS, wireless sensor, microphone, etc.). In other embodiments, the HMD 150 has a different configuration than shown in FIG. 2. For example, the image renderer 170, and/or the sensors 155A, 155B, 155C may be disposed in different locations than shown in FIG. 2.

Figure 3:
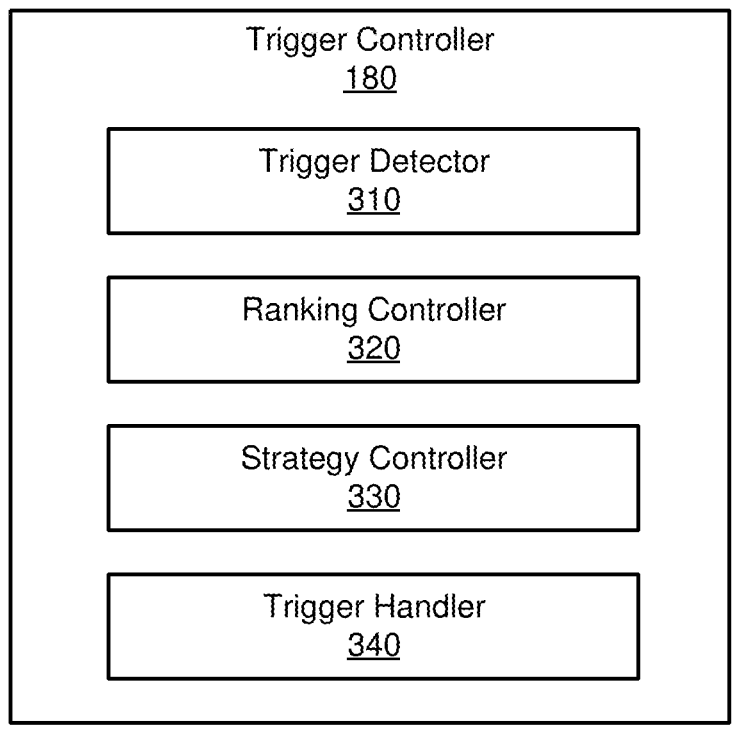
FIG. 3 is a diagram of a trigger controller, according to an example implementation of the present disclosure.

FIG. 3 is a diagram of a trigger controller 180 of FIG. 1, according to an example implementation of the present disclosure. In some embodiments, the trigger controller 180 includes a trigger detector 310, a ranking controller 320, a strategy controller 330, and a trigger handler 340. These components may operate together to determine a subset of a set of candidate triggers corresponding to one or more features in the environment, and generate effects to apply for the artificial reality according to the subset of the set of candidate triggers. In some embodiments, the trigger controller 180 includes more, fewer, or different components than shown in FIG. 3. In some embodiments, functionalities of some components may be performed by or in conjunction with the content provider 130 or a remote server. For example, some functionalities of the trigger detector 310, the ranking controller 320, or both may be performed by the content provider 130 or a remote server. In some embodiments, the trigger controller 180 includes more, fewer, or different components than shown in FIG. 3.

In some embodiments, the trigger detector 310 determines one or more features in an environment according to sensor measurements from the sensors 155, and determines a set of candidate triggers based on the detected features. A trigger may indicate or correspond to one or more effects to be applied on an artificial reality, according to a feature in an environment surrounding the HMD 150 or device. In one aspect, a trigger corresponds to or reflects an intent and/or action of a user operating the HMD 150 or device. The ranking controller 320 may rank the set of candidate triggers. The strategy controller 330 may determine a subset of the set of candidate triggers according to one or more predetermined policies. The strategy controller 330 may determine the subset of the set of candidate triggers based at least in part on the rankings of the set of candidate triggers. The trigger handler 340 may execute the subset of the set of candidate triggers to generate corresponding effects for applying to the artificial reality.

Figure 4:
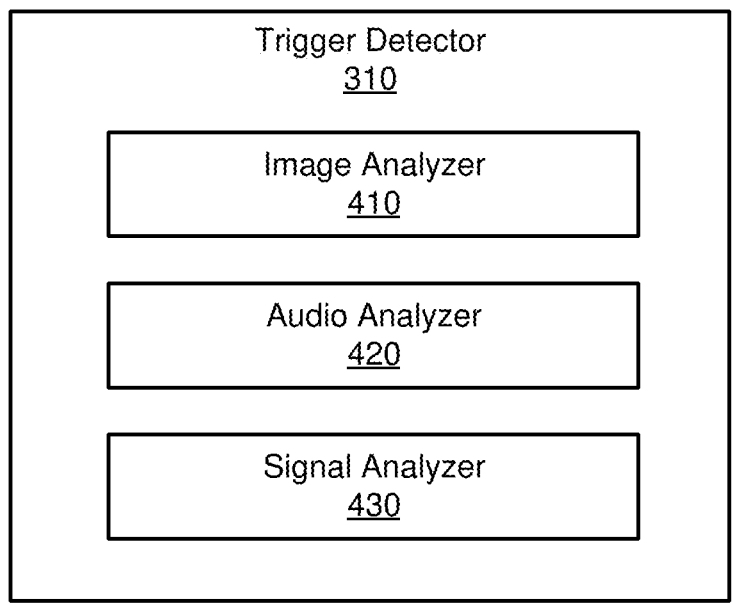
FIG. 4 is a diagram of a trigger detector, according to an example implementation of the present disclosure.

Referring to FIG. 4, illustrated is a diagram of the trigger detector 310 of FIG. 3, according to an example implementation of the present disclosure. In some embodiments, the trigger detector 310 includes an image analyzer 410, an audio analyzer, and a signal analyzer 430. These components may operate to detect one or more environmental features based on sensor measurements and determine candidate triggers according to detected features. In some embodiments, the trigger detector 310 includes more fewer, or different components than shown in FIG. 4.

In some embodiments, the image analyzer 410 is a component that determines candidate triggers from captured images. The image analyzer 410 may detect a predetermined shape or a predetermined structure in the image as a feature, and determine a corresponding candidate trigger according to the detected shape or structure. The image analyzer 410 may detect texts, an object, shape(s), color(s) or an optical code in an image, and can determine a candidate trigger associated with the detected texts, object, or optical code for applying corresponding effects to an artificial reality.

In one example, the image analyzer 410 includes an optical character recognizer that detects texts in a captured image, according to structures or patterns of characters in the texts. The image analyzer 410 may determine a candidate trigger to apply an effect to an artificial reality, according to the detected texts. Examples of effects according to the detected texts include displaying the detected texts, performing translation of the texts in one language into another language and display the translation, retrieving information associated with the detected texts and displaying the obtained information, etc.

In one example, the image analyzer 410 includes an object detector that detects an object in a captured image, according to an outline of a shape or a structure of the object. The image analyzer 410 may determine a candidate trigger to apply an effect to an artificial reality, according to the detected object. Examples of effects according to the detected object include retrieving information associated with the detected object and displaying the obtained information, etc. For example, a historic building can be detected in the captured image, and a history of the building may be presented as an effect applied to the artificial reality.

In one example, the image analyzer 410 includes a decoder that detects an optical code (e.g., pattern, image) in a captured image, according to an outline of a color, a shape or a structure of the optical code. Examples of the optical code can include a bar code or a QR code. The image analyzer 410 may decode the detected code, and determine a candidate trigger to apply an effect to an artificial reality, according to the decoded code. Examples of effects according to the decoded code include retrieving information associated with the decoded code and displaying the obtained information, etc. For example, an optical code on a product can be detected in the captured image, and a price of the product can be displayed as an effect applied to the artificial reality.

In some embodiments, the audio analyzer 420 is a component that detects candidate triggers from an audio signal. The audio analyzer 420 may detect a predetermined pattern in the audio signal as a feature, and determine a candidate trigger based on the detected pattern. For example, the audio analyzer 420 may detect a predetermined pattern of frequency and/or amplitude of the audio signal. The audio analyzer 420 may detect the predetermined pattern in the audio signal, and determine a candidate trigger associated with the detected pattern in the audio signal for applying corresponding effects to an artificial reality. Examples of effects according to the audio signal include retrieving information associated with the detected pattern in the audio signal and displaying the obtained information, etc. For example, music played can be detected, and information such as title, artist, and/or lyrics of the music can be presented.

In some embodiments, the signal analyzer 430 is a component that detects candidate triggers from a wireless signal. The signal analyzer 430 may detect a predetermined pattern in the wireless signal as a feature, and determine a candidate trigger based on the detected pattern in the wireless signal. For example, the signal analyzer 430 may detect a predetermined pattern of frequency and/or amplitude of the wireless signal. The signal analyzer 430 may detect the predetermined pattern in the wireless signal, and determine a candidate trigger associated with the detected pattern in the wireless signal for applying corresponding effects to an artificial reality. Examples of effects according to the audio signal include detecting another wireless device transmitting the wireless signal, establishing a communication link (e.g., cellular, Wi-Fi, Wi-Fi Direct, Bluetooth, near field communication (NFC), etc.) with the another wireless device, retrieving information associated with the detected pattern in the wireless signal and displaying the obtained information, etc. For example, a wireless signal can be detected, and a user interface to enable a communication link with a wireless device transmitting the wireless signal can be presented.

Figure 5:
FIG. 5 is a diagram of a ranking controller, according to an example implementation of the present disclosure.

FIG. 5 is a diagram of the ranking controller 320 of FIG. 3, according to an example implementation of the present disclosure. In some embodiments, the ranking controller 320 includes a trigger category controller 510 and a trigger score controller 520. These components may operate together to rank a set of candidate triggers from the trigger detector 310. In some embodiments, the ranking controller 320 is implemented by the HMD 150, the console 110, or both. In some embodiments, the ranking controller 320 includes more, fewer, or different components than shown in FIG. 5.

In some embodiments, the trigger category controller 510 is a component that determines, for each of the set of candidate triggers, a corresponding category. The trigger category controller 510 may categorize candidate triggers, for example, based on sources of the features detected, types of effects to be applied, or times at which corresponding effects are to be applied. For example, the trigger category controller 510 categorizes candidate triggers associated with texts detected by an OCR as a first category, categorizes candidate triggers associated with objects detected by an object detector as a second category, and categorizes candidate triggers associated with codes detected by a code detector as a third category. For example, the trigger category controller 510 categorizes candidate triggers for applying effects to the artificial reality during a first time period (e.g., within a minute) as a fourth category, and categorizes candidate triggers for applying effects to the artificial reality during a second time period (e.g., after a minute) as a fifth category.

In some embodiments, the trigger score controller 520 is a component that determines, for each of the set of candidate triggers, a corresponding score. The trigger score controller 520 may include a stack or a queue that receives triggers from the trigger detector 310. Trigger score controller 520 may assign scores to the set of candidate triggers according to the order of candidate triggers received by the stack or the queue. The trigger score controller 520 may apply weights according to the categories to assign scores to the set of candidate triggers. For example, the trigger score controller 520 may multiply a score or an order of a candidate trigger by a weight corresponding to a type of the candidate trigger to obtain an updated weight. The trigger score controller 520 may also determine scores of the candidate triggers, according to a number of repetitions of the candidate triggers. For example, the trigger score controller 520 may determine a number of repetitions or reoccurrences of a same candidate trigger within a time period, and multiply a score or an order of the candidate trigger by the number of repetitions. In one aspect, a number of repetitions for a candidate trigger may decay by a predetermined rate, in response to not determining that the same candidate trigger has not reoccurred for a predetermined time period (e.g., 5 minutes). According to the scores of the set of candidate triggers, the set of candidate triggers may be ranked.

Figure 6:
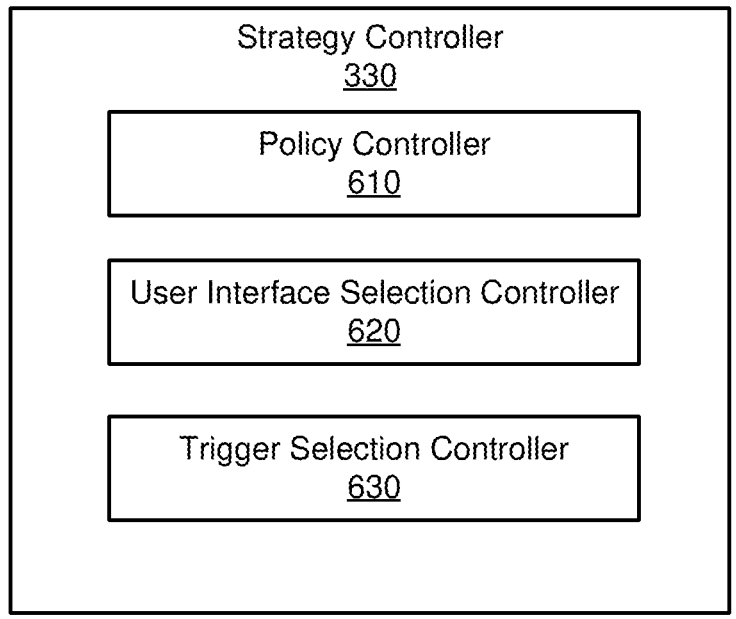
FIG. 6 is a diagram of a strategy controller, according to an example implementation of the present disclosure.

FIG. 6 is a diagram of the strategy controller 330 of FIG. 3, according to an example implementation of the present disclosure. In some embodiments, the strategy controller 330 includes a policy controller 610, a user interface selection controller 620, and a trigger selection controller 630. These components may operate together to determine, from a set of candidate triggers, a subset of the candidate triggers according to a predetermined policy. In some embodiments, the strategy controller 330 includes more, fewer, or different components than shown in FIG. 6.

In some embodiments, the policy controller 610 is a component that generates and stores one or more policies for determining a subset of candidate triggers from a set of candidate triggers. A policy may indicate or specify a rule for selecting one or more candidate triggers for applying effects to an artificial reality. The policies may be predetermined, and may be modified by a user of the HMD 150. In one aspect, a policy specifies a number of effects that can be simultaneously presented within a time period. In one aspect, a policy specifies different areas of a display region of the electronic display 175, and a corresponding number of effects that may be rendered for each area. For example, a policy specifies that a left top corner may present up to two effects at a time, and a right bottom corner may present one effect at a time. The policy may specify types or categories of effects that may be presented for different areas of the display region. For example, a first area of the display region may present an alarm or information of an object detected, and a second area of the display region may present settings or statuses of the artificial reality presented.

In some embodiments, the user interface selection controller 620 is a component that generates a user interface for selecting candidate triggers. In one example, the user interface selection controller 620 generates or obtains a list of available candidate triggers, and presents a selectable indication of the list of available candidate triggers through a user interface. The user interface selection controller 620 may receive a user selection of one or more candidate triggers.

In some embodiments, the trigger selection controller 630 is a component that determines or selects a subset of candidate triggers, and generates corresponding effects for applying to an artificial reality according to the determined subset of the candidate triggers. In one aspect, the trigger selection controller 630 determines or selects a subset of candidate triggers according to one or more policies from the policy controller 610. In one approach, the trigger selection controller 630 determines or selects a subset of candidate triggers according to rankings from the ranking controller 320. The trigger selection controller 630 may determine one or more areas of the display region, and select or determine, for each area, one or more candidate triggers to execute for applying effects. For example, the trigger selection controller 630 may determine or identify areas for presenting effects according to a policy. For another example, the trigger selection controller 630 may adaptively determine one or more areas of a display region, on which effects can be presented. The trigger selection controller 630 may determine, for each area, a corresponding subset of candidate triggers. The trigger selection controller 630 may also receive a user selection of candidate triggers from the user interface selection controller 620, and can determine to include the selected candidate triggers in the subset of candidate triggers. In one aspect, the trigger selection controller 630 determines an order or a sequence of execution of the subset of candidate triggers.

The trigger handler 340 of FIG. 3 may execute the subset of candidate triggers determined by the trigger selection controller 630 to generate corresponding effects to apply to an artificial reality. Examples of effects applied to the artificial reality includes modifying a setting of a presentation of the artificial reality, presenting a virtual object in the artificial reality, presenting information via the artificial reality, presenting a sound for the artificial reality, presenting a profile via the artificial reality, etc. Unselected candidate triggers may not be presented. Accordingly, more relevant or important information can be rendered in the artificial reality, where less relevant or less important information can be omitted or presented at a later time.

Figure 7A:
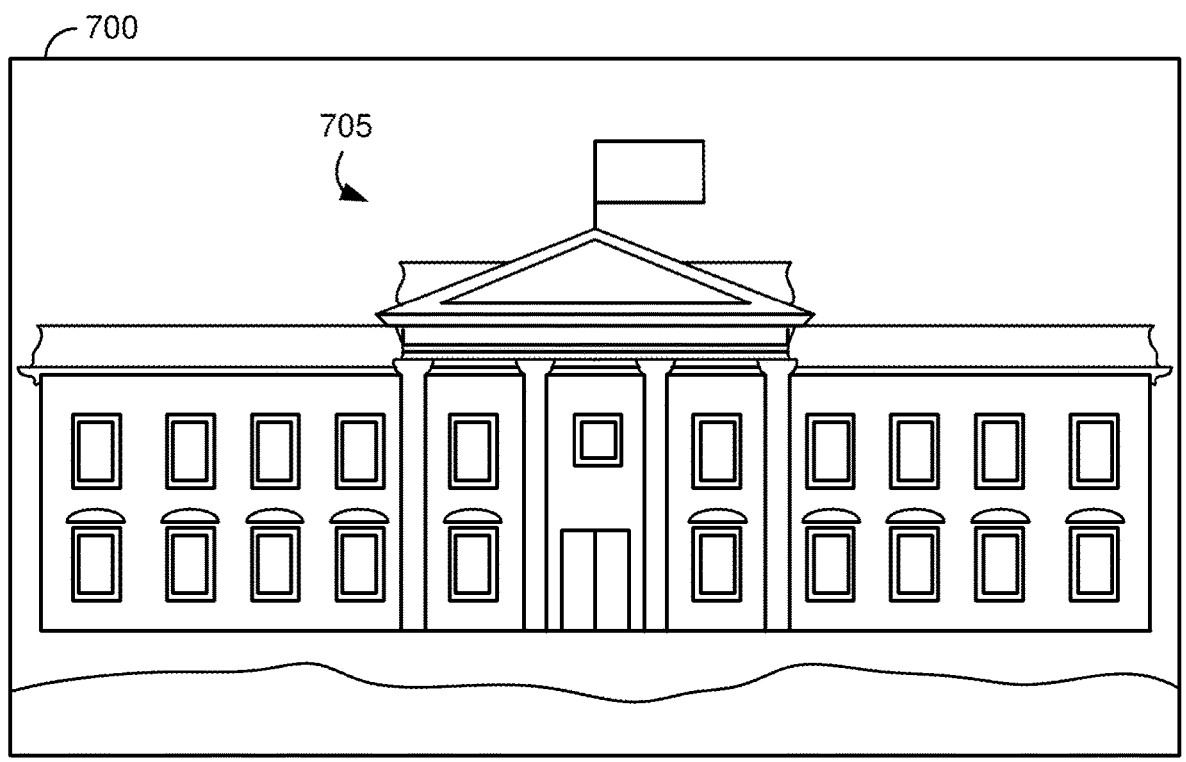
FIG. 7A is a diagram of an example image captured by a head mounted display, according to an example implementation of the present disclosure.

FIG. 7A is a diagram of an example image 700 captured by a HMD 150, according to an example implementation of the present disclosure. In some embodiments, the image 700 captured corresponds to a view of a user wearing the HMD 150. The image may be captured by an imaging sensor of the HMD 150, and presented through the electronic display 175. In the example shown in FIG. 7A, a building 705 is captured in the image 700.

Figure 7B:
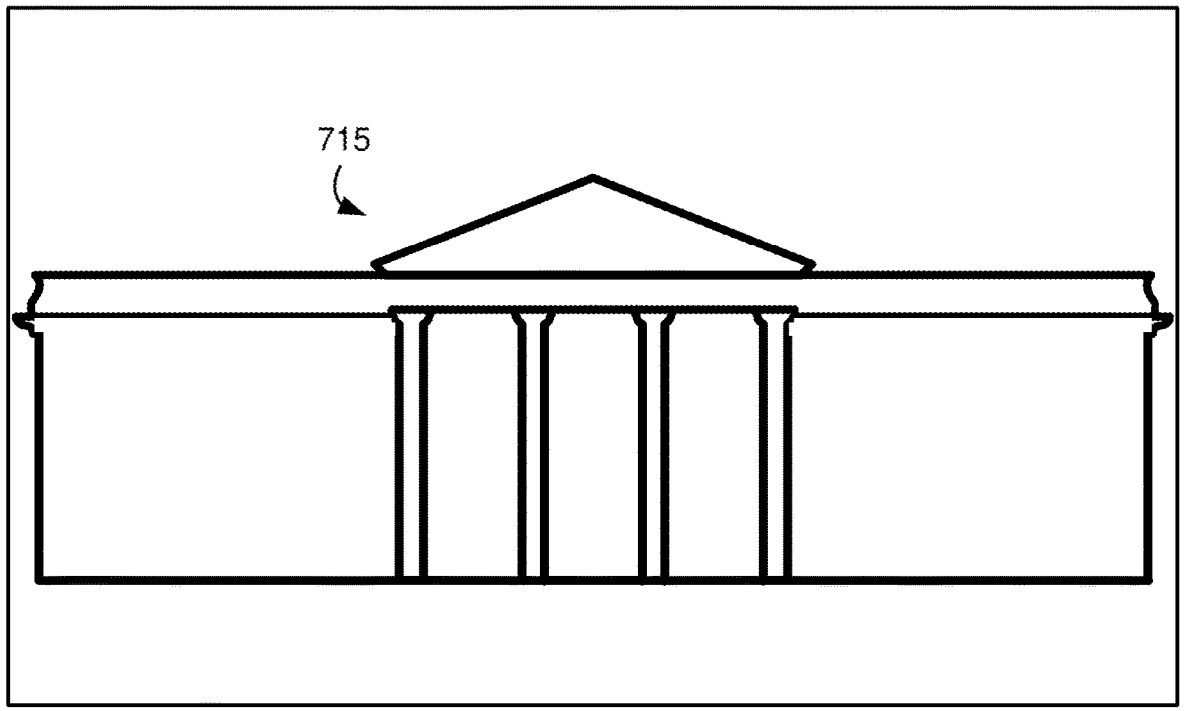
FIG. 7B is a diagram of an example template for detecting an object, according to an example implementation of the present disclosure.

Referring to FIG. 7B, illustrated is a diagram of an example template 715 for detecting the building 705, according to an example implementation of the present disclosure. In one example, the trigger detector 310 (e.g., the image analyzer 410) stores the template 715 of the building 705. A template can include, describe or specify various characteristics such as shape(s), color(s), structure(s), size, dimensions, etc. The trigger detector 310 may retrieve the template 715 among templates of other objects or buildings, according to a location of the HMD 150. The trigger detector 310 may obtain an outline of an object in the captured image 700, and can compare the outline with the template 715 to determine whether the object is or matches the characteristics of the building 705. In response to determining that the outline of the building matches the template 715, the trigger detector 310 may retrieve information associated with the building 705. For example, the trigger detector 310 can obtain or search for a history or description of the building 705.

Figure 7C:
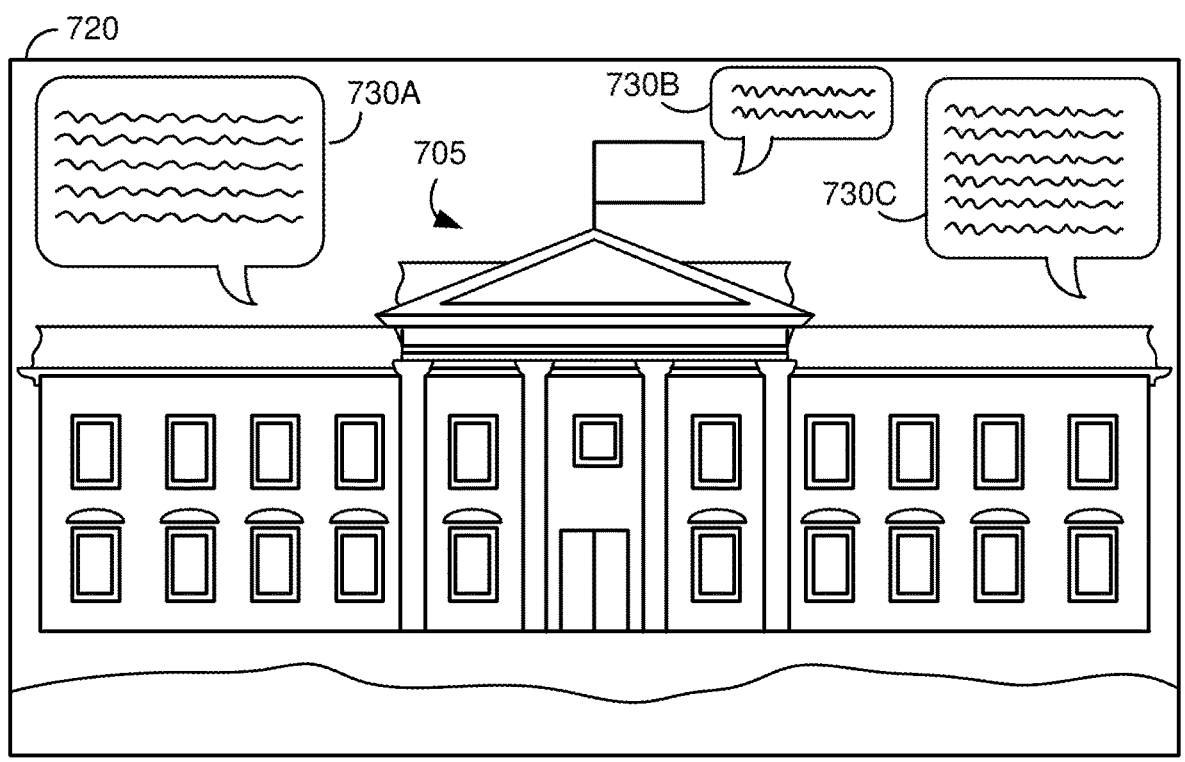
FIG. 7C is a diagram of an example image captured by a head mounted display with various information overlaid on the captured image, according to an example implementation of the present disclosure.

Referring to FIG. 7C, various messages 730A, 730B, 730C can be overlaid on the captured image 720, according to an example implementation of the present disclosure. Triggers can be executed to generate effects for presenting messages 730A, 730B, 730C in artificial reality, according to features in an environment of the HMD 150. In one example, the message 730A includes information associated with the building 705, the message 730B includes recommendations of nearby points of interests or restaurants based on a location of the HMD 150, and the message 730C includes information indicating nearby wireless devices obtained based on wireless signals.

Figure 7D:
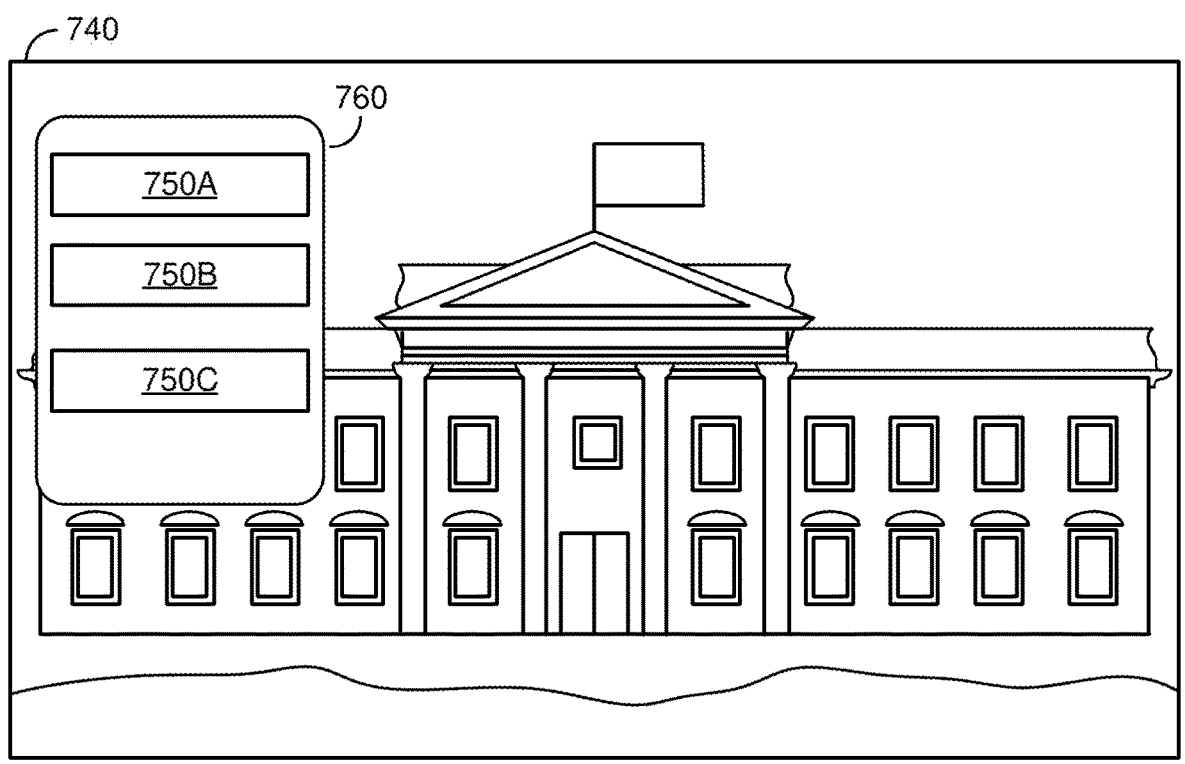
FIG. 7D is a diagram of an example user interface allowing a user to select one or more information to present, according to an example implementation of the present disclosure.

Referring to FIG. 7D, illustrated is a diagram of an image 740 with an example user interface 760 allowing a user to select one or more information to present, according to an example implementation of the present disclosure. In one example, the user interface 760 includes selectable indications 750A, 750B, 750C associated with corresponding triggers. A user may select an indication to execute or initiate a corresponding trigger. The trigger controller 180 may receive the user selection, and execute a trigger associated with the selected indication to generate a corresponding effect for enhancing or applying to the artificial reality.

Figure 8:
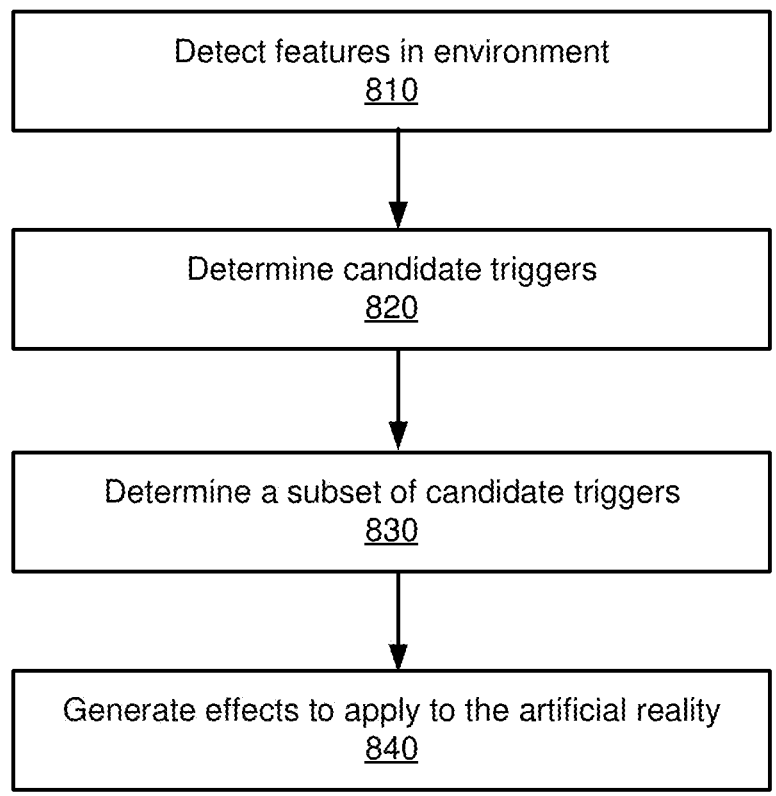
FIG. 8 is a flow chart illustrating a process of generating effects to apply to artificial reality according to features in an environment, according to an example implementation of the present disclosure.

FIG. 8 is a flow chart illustrating a process 800 of generating effects to apply to artificial reality according to features in an environment, according to an example implementation of the present disclosure. In some embodiments, the process 800 is performed by a user device (e.g., HMD 150). In some embodiments, the process 800 is performed by other entities or in conjunction with other devices (e.g., the console 110 or a remote server). In some embodiments, the process 800 includes more, fewer, or different steps than shown in FIG. 8.

In one approach, the user device detects 810 features in an environment. In one approach, the user device includes one or more sensors that generate sensor measurements of an environment an environment surrounding the user device. Examples of the sensors for detecting one or more features include one or more microphones, one or more imaging sensors, one or more wireless signal detectors, one or more of the sensors used for detecting a location and/or orientation of the user device, etc. In one example, a microphone can detect a sound and generate an audio signal electrically describing the detected sound. In one example, an imaging sensor can capture an image corresponding to a view of the user. In one example, a wireless signal detector can receive, measure or detect a wireless signal at a predetermined frequency (e.g., ISM, Wi-Fi, any cellular frequency bands, or any frequency), and detect a nearby device according to the wireless signal. In one example, a global positioning system can determine a location of the user device. The user device may detect features based on the sensor measurements. For example, the user device may detect a predetermined shape or structure in a captured image. For another example, the user device may detect a predetermined pattern or characteristic in an audio signal.

In one approach, the user device (or a remote server, or both) determines 820 a set of candidate triggers according to the detected features in the environment. The user device may determine a set of candidate triggers based on features detected. A trigger may indicate or correspond to one or more effects to be applied on an artificial reality, according to a feature in an environment surrounding the user device. In one aspect, a trigger corresponds to or reflects an intent of a user operating the user device (e.g., orienting or pointing the device, to view, sense or detect features from the environment). In one example, the user device may detect texts in a captured image, according to structures or patterns of characters in the texts, and determine a candidate trigger to apply an effect to an artificial reality, according to the detected texts. In one example, the user device may detect an object in a captured image, according to an outline of a shape or a structure of the object, and determine a candidate trigger to apply an effect to an artificial reality, according to the detected object. In one example, the user device may detect and decode an optical code (e.g., QR code or bar code) in a captured image, and determine a candidate trigger to apply an effect to an artificial reality, according to the decoded code. In one example, the user device may detect a candidate trigger based on a predetermined pattern of frequency and/or amplitude in an audio signal, and determine a candidate trigger associated with the detected pattern in the audio signal for applying corresponding effects to an artificial reality. In one example, the user device may detect a candidate trigger based on a predetermined pattern in the wireless signal.

In one approach, the user device (or a remote server, or both) determines 830 (e.g., selects, shortlist) a subset of candidate triggers from the set of candidate triggers. The user device may determine a subset of the set of candidate triggers according to one or more policies. The policies may be predetermined or adjusted adaptively. For example, a policy specifies a number of effects that can be simultaneously presented within a time period. For example, a policy specifies different areas of a display region, and a corresponding number of effects that may be rendered for each area. The policy may also specify types or categories of effects that may be presented for different areas of the display region. The user device may determine, for each area of a display region, a corresponding subset of candidate triggers, according to the one or more policies. The user device may also determine a sequence of the subset of candidate triggers to be executed according to the one or more policies.

The user device, a remote server, or both may rank the set of candidate triggers. Rankings may be determined based on an order of candidate triggers detected or received, categories of candidate triggers, a frequency or a number of repetitions of a same candidate triggered determined or occurred within a time period, etc. The user device may determine the subset of the set of candidate triggers based at least in part on the rankings of the set of candidate triggers.

In one approach, the trigger controller 180 generates 840 effects to apply to the artificial reality according to the subset of the candidate triggers. The user device may execute the subset of the set of candidate triggers to generate corresponding effects for applying to the artificial reality. Examples of effects applied to the artificial reality includes modifying a setting of a presentation of the artificial reality, presenting a virtual object in the artificial reality, presenting information via the artificial reality, presenting a sound for the artificial reality, presenting a profile via the artificial reality, etc. Unselected candidate triggers may not be presented. Hence, a user can consume more relevant information associated with environmental features, without getting disturbed or overwhelmed by irrelevant information.

Figure 9:
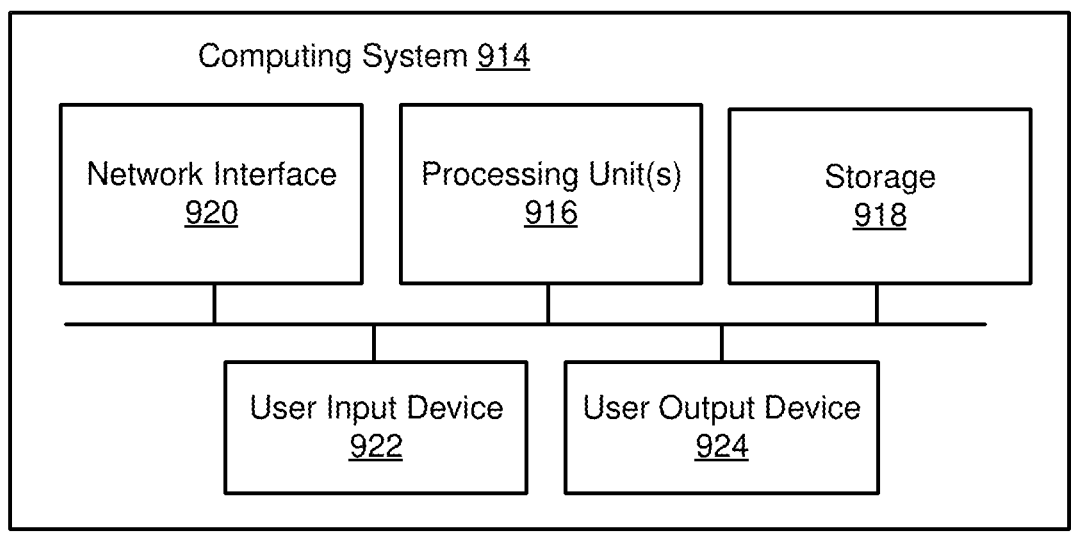
FIG. 9 is a block diagram of a computing environment according to an example implementation of the present disclosure.

Various operations described herein can be implemented on computer systems. FIG. 9 shows a block diagram of a representative computing system 914 usable to implement the present disclosure. In some embodiments, the console 110, the HMD 150 or both of FIG. 1 are implemented by the computing system 914. Computing system 914 can be implemented, for example, as a consumer device such as a smartphone, other mobile phone, tablet computer, wearable computing device (e.g., smart watch, eyeglasses, head mounted display), desktop computer, laptop computer, or implemented with distributed computing devices. The computing system 914 can be implemented to provide VR, AR, MR experience. In some embodiments, the computing system 914 can include conventional computer components such as processors 916, storage device 918, network interface 920, user input device 922, and user output device 924.

Network interface 920 can provide a connection to a wide area network (e.g., the Internet) to which WAN interface of a remote server system is also connected. Network interface 920 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 922 can include any device (or devices) via which a user can provide signals to computing system 914; computing system 914 can interpret the signals as indicative of particular user requests or information. User input device 922 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 924 can include any device via which computing system 914 can provide information to a user. For example, user output device 924 can include a display to display images generated by or delivered to computing system 914. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 924 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 916 can provide various functionality for computing system 914, including any of the functionality described herein as being performed by a server or client, or other functionality associated with message management services.

It will be appreciated that computing system 914 is illustrative and that variations and modifications are possible. Computer systems used in connection with the present disclosure can have other capabilities not specifically described here. Further, while computing system 914 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
   determining, by a device according to features detected in an environment, a set of candidate triggers for applying effects to an artificial reality provided by the device for the environment;
   determining, by the device according to a predetermined policy for selecting one or more candidate triggers for applying effects to the artificial reality, a subset of the set of candidate triggers, the predetermined policy specifying (i) a limit of a number of effects to apply to the artificial reality within a time period, and (ii) a defined area within a display region of the artificial reality in which to apply effects to the artificial reality according to one or more effect types for the effects;
   generating, by the device according to the subset of the set of candidate triggers, one or more effects corresponding to the features detected in the environment, to apply to the artificial reality; and
   applying, by the device, the one or more effects to the artificial reality in the defined area of the displayed region corresponding to an effect type for the one or more effects, according to the limit of the number of effects.

2. The method of claim 1, further comprising:
   detecting, by the device, the features in the environment;
   providing, by the device, at least one of the detected features to a remote server to cause the remote server to detect a first candidate trigger for applying effects to the artificial reality; and
   determining, by the device, the set of candidate triggers, the set of candidate triggers including the first candidate trigger detected by the remote server.

3. The method of claim 1, wherein detecting, by the device, the features in the environment includes:
   capturing an image of the environment, and
   detecting, as one of the features in the environment, a predetermined shape or structure in the captured image.

4. The method of claim 1, wherein detecting, by the device, the features in the environment includes:
   capturing an audio signal of a sound in the environment, and
   detecting, as one of the features in the environment, a predetermined pattern in the audio signal.

5. The method of claim 1, wherein generating the one or more effects to apply to the artificial reality includes:
   modifying a setting of a presentation of the artificial reality,
   presenting a virtual object in the artificial reality,
   presenting information via the artificial reality,
   presenting a sound for the artificial reality, or
   presenting a profile via the artificial reality.

6. The method of claim 1, further comprising:
   determining rankings of the set of candidate triggers; and
   determining the subset of the set of candidate triggers according to the rankings.

7. The method of claim 6, further comprising determining the rankings according to scores or categories of the set of candidate triggers.

8. The method of claim 1, wherein determining the subset of the set of candidate triggers includes:
   presenting selectable indications of the set of candidate triggers to a user of the artificial reality, and
   receiving a selection of one or more of the subset of the set of candidate triggers from the user.

9. A system comprising:
   a processor; and
   a non-transitory computer readable medium storing instructions when executed by the processor cause the processor to:
   determine, according to features detected in an environment, a set of candidate triggers for applying effects to an artificial reality provided for the environment,
   determine, according to a predetermined policy for selecting one or more candidate triggers for applying effects to the artificial reality, a subset of the set of candidate triggers, the predetermined policy specifying (i) a limit of a number of effects to apply to the artificial reality within a time period, and (ii) a defined area within a display region of the artificial reality in which to apply effects to the artificial reality according to one or more effect types for the effects, generate, according to the subset of the set of candidate triggers, one or more effects corresponding to the features detected in the environment, to apply to the artificial reality, and apply the one or more effects to the artificial reality in the defined area of the displayed region corresponding to an effect type for the one or more effects, according to the limit of the number of effects.

10. The system of claim 9, wherein the instructions when executed by the processor cause the processor to:

detect the features in the environment, provide at least one of the detected features to a remote server to cause the remote server to detect a first candidate trigger for applying effects to the artificial reality, and determine the set of candidate triggers, the set of candidate triggers including the first candidate trigger detected by the remote server.

11. The system of claim 9, wherein the instructions when executed by the processor cause the processor to:

capture an image of the environment, and detect, as one of the features in the environment, a predetermined shape or structure in the captured image.

12. The system of claim 9, wherein the instructions when executed by the processor cause the processor to:

capture an audio signal of a sound in the environment, and detect, as one of the features in the environment, a predetermined pattern in the audio signal.

13. The system of claim 9, wherein the instructions when executed by the processor cause the processor to generate the one or more effects to apply to the artificial reality by:

modifying a setting of a presentation of the artificial reality, presenting a virtual object in the artificial reality, presenting information via the artificial reality, presenting a sound for the artificial reality, or presenting a profile via the artificial reality.

14. The system of claim 9, wherein the instructions when executed by the processor cause the processor to:

determine rankings of the set of candidate triggers; and determine the subset of the set of candidate triggers according to the rankings.

15. The system of claim 14, wherein the instructions when executed by the processor cause the processor to determine the rankings according to scores or categories of the set of candidate triggers.

16. The system of claim 9, wherein the instructions when executed by the processor cause the processor to determine the subset of the set of candidate triggers by:

presenting selectable indications of the set of candidate triggers to a user of the artificial reality, and receiving a selection of one or more of the subset of the set of candidate triggers from the user of the artificial reality.

17. A non-transitory computer readable medium storing instructions when executed by a processor cause the processor to:

determine, according to features detected in an environment, a set of candidate triggers for applying effects to an artificial reality provided for the environment;

determine, according to a predetermined policy for selecting one or more candidate triggers for applying effects to the artificial reality, a subset of the set of candidate triggers, the predetermined policy specifying (i) a limit of a number of effects to apply to the artificial reality within a time period, and (ii) a defined area within a display region of the artificial reality in which to apply effects to the artificial reality according to one or more effect types for the effects;

generate, according to the subset of the set of candidate triggers, one or more effects corresponding to the features detected in the environment, to apply to the artificial reality; and apply the one or more effects to the artificial reality in the defined area of the displayed region corresponding to an effect type for the one or more effects, according to the limit of the number of effects.

18. The non-transitory computer readable medium of claim 17, further comprising instructions when executed by the processor cause the processor to:

detect the features in the environment, provide at least one of the detected features to a remote server to cause the remote server to detect a first candidate trigger for applying effects to the artificial reality, and determine the set of candidate triggers, the set of candidate triggers including the first candidate trigger detected by the remote server.

* * * * *